(12) United States Patent
Fish et al.

(10) Patent No.: US 10,007,074 B2
(45) Date of Patent: Jun. 26, 2018

(54) OPTICAL AND THERMAL INTERFACE FOR PHOTONIC INTEGRATED CIRCUITS

(71) Applicant: Aurrion, Inc., Goleta, CA (US)

(72) Inventors: Gregory Alan Fish, Santa Barbara, CA (US); Brian R. Koch, Brisbane, CA (US)

(73) Assignee: Aurrion, Inc., Goleta, CA (US)

( * ) Notice: Subject to any disclaimer, the term of this patent is extended or adjusted under 35 U.S.C. 154(b) by 0 days. days.

(21) Appl. No.: 15/230,631

(22) Filed: Aug. 8, 2016

(65) Prior Publication Data

US 2017/0031112 A1 Feb. 2, 2017

Related U.S. Application Data

(63) Continuation of application No. 14/611,392, filed on Feb. 2, 2015, now Pat. No. 9,417,411.

(Continued)

(51) Int. Cl.
*G02B 6/42* (2006.01)
*G02B 6/12* (2006.01)
(Continued)

(52) U.S. Cl.
CPC ....... *G02B 6/4224* (2013.01); *G02B 6/12004* (2013.01); *G02B 6/1221* (2013.01);
(Continued)

(58) Field of Classification Search
None
See application file for complete search history.

(56) References Cited

U.S. PATENT DOCUMENTS

| 4,935,939 A | 6/1990 | Liau et al. |
| 5,680,698 A | 10/1997 | Armington et al. |

(Continued)

FOREIGN PATENT DOCUMENTS

| EP | 1068552 B1 | 9/2001 |
| WO | WO-2004086111 A1 | 10/2004 |
| WO | WO-2013089755 | 6/2013 |

OTHER PUBLICATIONS

"U.S. Appl. No. 14/611,392, Notice of Allowance dated Apr. 29, 2016", 9 pgs.

(Continued)

*Primary Examiner* — Tina Wong
(74) *Attorney, Agent, or Firm* — Schwegman Lundberg & Woessner, P.A.

(57) ABSTRACT

Described herein are photonic systems and devices including a optical interface unit disposed on a bottom side of a photonic integrated circuit (PIC) to receive light from an emitter of the PIC. A top side of the PIC includes a flip-chip interface for electrically coupling the PIC to an organic substrate via the top side. An alignment feature corresponding to the emitter is formed with the emitter to be offset by a predetermined distance value; because the emitter and the alignment feature are formed using a shared processing operation, the offset (i.e., predetermined distance value) may be precise and consistent across similarly produced PICs. The PIC comprises a processing feature to image the alignment feature from the bottom side (e.g., a hole). A heat spreader layer surrounds the optical interface unit and is disposed on the bottom side of the PIC to spread heat from the PIC.

14 Claims, 11 Drawing Sheets

Related U.S. Application Data (60) Provisional application No. 61/943,108, filed on Feb. 21, 2014.

(51) Int. Cl.
  *G02B 6/122* (2006.01)
  *G02B 6/132* (2006.01)
  *G02B 6/136* (2006.01)

(52) U.S. Cl.
  CPC ............ *G02B 6/132* (2013.01); *G02B 6/136* (2013.01); *G02B 6/4204* (2013.01); *G02B 6/428* (2013.01); *G02B 6/4219* (2013.01); *G02B 6/4269* (2013.01); *G02B 6/4232* (2013.01); *Y10T 29/49117* (2015.01)

(56) References Cited

U.S. PATENT DOCUMENTS

| | | | |
|---|---|---|---|
| 6,095,697 A | 8/2000 | Lehman et al. | |
| 6,146,025 A | 11/2000 | Abbink et al. | |
| 6,256,437 B1 | 7/2001 | Sakushima et al. | |
| 6,519,099 B1 | 2/2003 | Blair et al. | |
| 6,729,771 B2 | 5/2004 | Kim et al. | |
| 6,739,766 B2 | 5/2004 | Xu et al. | |
| 6,741,778 B1 | 5/2004 | Chan et al. | |
| 6,815,729 B1 | 11/2004 | Brophy et al. | |
| 6,838,689 B1 | 1/2005 | Deng et al. | |
| 6,903,934 B2 | 6/2005 | Lo et al. | |
| 7,004,642 B2 | 2/2006 | Chen et al. | |
| 7,004,644 B1 * | 2/2006 | Johnson | G02B 6/4204 257/680 |
| 7,289,701 B2 | 10/2007 | Lam et al. | |
| 7,298,941 B2 | 11/2007 | Palen et al. | |
| 7,358,599 B2 | 4/2008 | Ohe et al. | |
| 7,371,014 B2 | 5/2008 | Willis et al. | |
| 7,881,580 B2 * | 2/2011 | Watanabe | G02B 6/42 385/129 |
| 8,265,432 B2 * | 9/2012 | Doany | G02B 6/4201 257/432 |
| 8,348,522 B2 | 1/2013 | Kuznia et al. | |
| 8,373,259 B2 | 2/2013 | Kim et al. | |
| 8,684,612 B2 | 4/2014 | Kim et al. | |
| 8,731,347 B2 | 5/2014 | Chan et al. | |
| 8,787,766 B1 | 7/2014 | Shu et al. | |
| 8,855,452 B2 | 10/2014 | Andry et al. | |
| 8,873,907 B2 | 10/2014 | Kou | |
| 9,417,411 B2 | 8/2016 | Fish et al. | |
| 2003/0044120 A1 | 3/2003 | Mignosi et al. | |
| 2006/0291771 A1 | 12/2006 | Braunisch et al. | |
| 2007/0085215 A1 | 4/2007 | Budd et al. | |
| 2013/0259419 A1 | 10/2013 | Charbonneau-Lefort | |
| 2013/0308898 A1 | 11/2013 | Doerr et al. | |
| 2014/0044388 A1 | 2/2014 | Su et al. | |
| 2014/0099059 A1 | 4/2014 | Pommer et al. | |
| 2014/0147078 A1 | 5/2014 | Bhagavatula et al. | |
| 2014/0153871 A1 | 6/2014 | Kuo | |
| 2014/0177998 A1 | 6/2014 | Tseng | |
| 2014/0185983 A1 | 7/2014 | Sandhu et al. | |
| 2014/0205237 A1 * | 7/2014 | Mathai | G02B 6/4204 385/33 |
| 2014/0321816 A1 | 10/2014 | Wu | |
| 2015/0219850 A1 | 8/2015 | Fish et al. | |
| 2015/0241631 A1 | 8/2015 | Fish et al. | |

OTHER PUBLICATIONS

"U.S. Appl. No. 14/611,392, Notice of Allowance dated Jun. 8, 2016", 8 pgs.

"European Application Serial No. 15000487.7, Extended European Search Report dated Jun. 29, 2015", 9 pgs.

Adachi, Koichiro, et al., "25-Gb/s Multchannel 1.3-μm Surface-Emitting Lens-Integrated DFB Laser Arrays", (Oct. 1, 2011), 2899-2905.

Palen, Edward, "Low Cost Optical Interconnects", Photonics Packaging, Integration and Interconnects VII, Proceedings of SPIE, vol. 6478, (2007), 5 pgs.

Palen, Edward, "Optical Coupling to Monolithic Integrated Photonic Circuits,", Photonics Packaging, Integration and Interconnects VII, Proceedings of SPIE, vol. 6478, (2007), 6 pgs.

Strzelecka, E.M., et al., "Monolithic Integration of Refractive Lenses With Vertical Cavity Lasers and Detectors for Optical Interconnections", Proc. SPIE2691, The International Society for Optical Engineering, Optoelectronic Packaging, v. 43, (Mar. 29, 1996).

Suzuki, Takanori, et al., "A Light Source Using 1.3μm Lens-Integrated Surface-Emitting Laser for Silicon Platforms", IEEE Photonics Technology Letters, v. 26, n. 11, (Jun. 1, 2014), 1089-1091.

\* cited by examiner

OPTICAL AND THERMAL INTERFACE FOR PHOTONIC INTEGRATED CIRCUITS

CROSS-REFERENCE TO RELATED APPLICATIONS

This application is a continuation of U.S. application Ser. No. 14/611,392, filed Feb. 2, 2015,which application claims the benefit of priority to U.S. Provisional Patent Application entitled "Optical and Thermal Interface for Photonic Integrated Circuits," Ser. No. 61/943,108, filed Feb. 21, 2014, which is hereby incorporated herein by reference in its entirety.

FIELD

Embodiments generally pertain to optical devices and more specifically to optical and thermal interfaces for photonic integrated circuits.

BACKGROUND

"Flip-chip" designs provide photonic chips with a dense and high-speed electrical input/output (I/O) interface, while also providing photonic chips with enhanced heat dissipation. Some optical I/O interfaces for photonic chips, however, are not compatible with flip-chip packaging as these optical I/O interfaces are at the top or edge of the chip. Some solutions utilize an output lens formed from the substrate of a photonic chip, but these solutions greatly increase the thickness of the substrate, and therefore the size of the photonic chip.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, such phrases are also not necessarily mutually exclusive.

Descriptions of certain details and implementations follow, including a description of the figures, which may depict some or all of the embodiments described below, as well as a description of other potential embodiments or implementations of the concepts presented herein. An overview of embodiments is provided below, followed by a more detailed description with reference to the drawings.

Description

Embodiments of the disclosure describe optical and thermal interfaces for photonic integrated circuits (PICs). Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the disclosure.

Figure 1A:
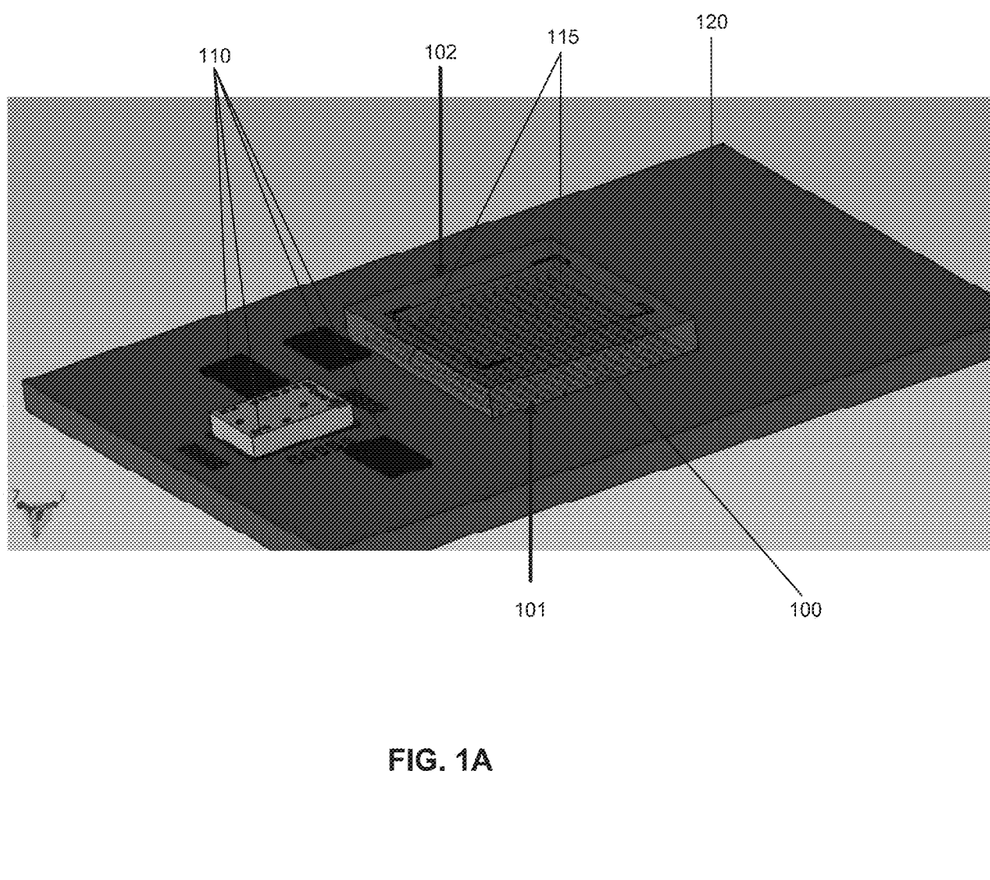
FIG. 1A-FIG. 1D are illustrations of components of a device or system including a photonic integrated circuit (PIC), according to an embodiment of the disclosure.

FIG. 1A-FIG. 1D are illustrations of components of a device or system including a PIC according to an embodiment of the disclosure. FIG. 1A illustrates some components of a device or system, including a PIC 100 and one or more electronic components 110 disposed on an organic substrate 120. The PIC 100 may be formed of any semiconductor material suitable for photonic devices and photonic operation, such as silicon-based materials (e.g., silicon (Si), silicon nitride (SiN)); non-silicon material such as III-V material, magneto-optic material, or crystal substrate material; or a combination of silicon and non-silicon material (alternatively referred to as "heterogeneous material"). The PIC 100 may include one or more optical devices controlled and or driven, at least in part, by control and/or driver circuitry included in the electronic components 110. The electronic components 110 may include one or more application specific integrated circuits (ASICs), and may be formed of any semiconductor material suitable for electronic devices and electronic operation, such as Si.

The organic substrate 120 may be formed of any substrate material suitable for housing interconnections between the PIC 100 and the electronic components 110, such as polymide or glass-reinforced epoxy laminate sheets such as flame retardant-4 (FR-4). The organic substrate 120 may comprise one or more layers of power planes, ground planes, through-vias, and/or signal lines that route electrical signals to and between the PIC 100 and the electronic components 110; said layers may also be included in a printed circuit board (PCB) substrate coupled to the organic substrate 120. Other components of the device or system not illustrated may include interconnection modules, power supplies, etc.

In this embodiment, the PIC 100 comprises a "flip-chip" design, wherein interconnects 115 (e.g., copper (Cu) pillars, a ball grid array (BGA) of solder bumps, etc.) are formed on a top side 101 of the PIC 100 (e.g., during a final substrate processing step). In order to mount the PIC 100 to the organic substrate 120, it is "flipped" over so that the top side 101 faces down and a bottom side 102 faces up, as shown in FIG. 1A. The PIC 100 is aligned so that the interconnects 115 are aligned with matching pads on the organic substrate 120. The flip-chip design of the PIC 100 allows for dense and high-speed electrical interconnects to be utilized between the PIC 100 and the electronic components 110. Furthermore, the flip-chip design of the PIC 100 allows for superior heat dissipation, which is a major limiter of bandwidth density.

Figure 1B:
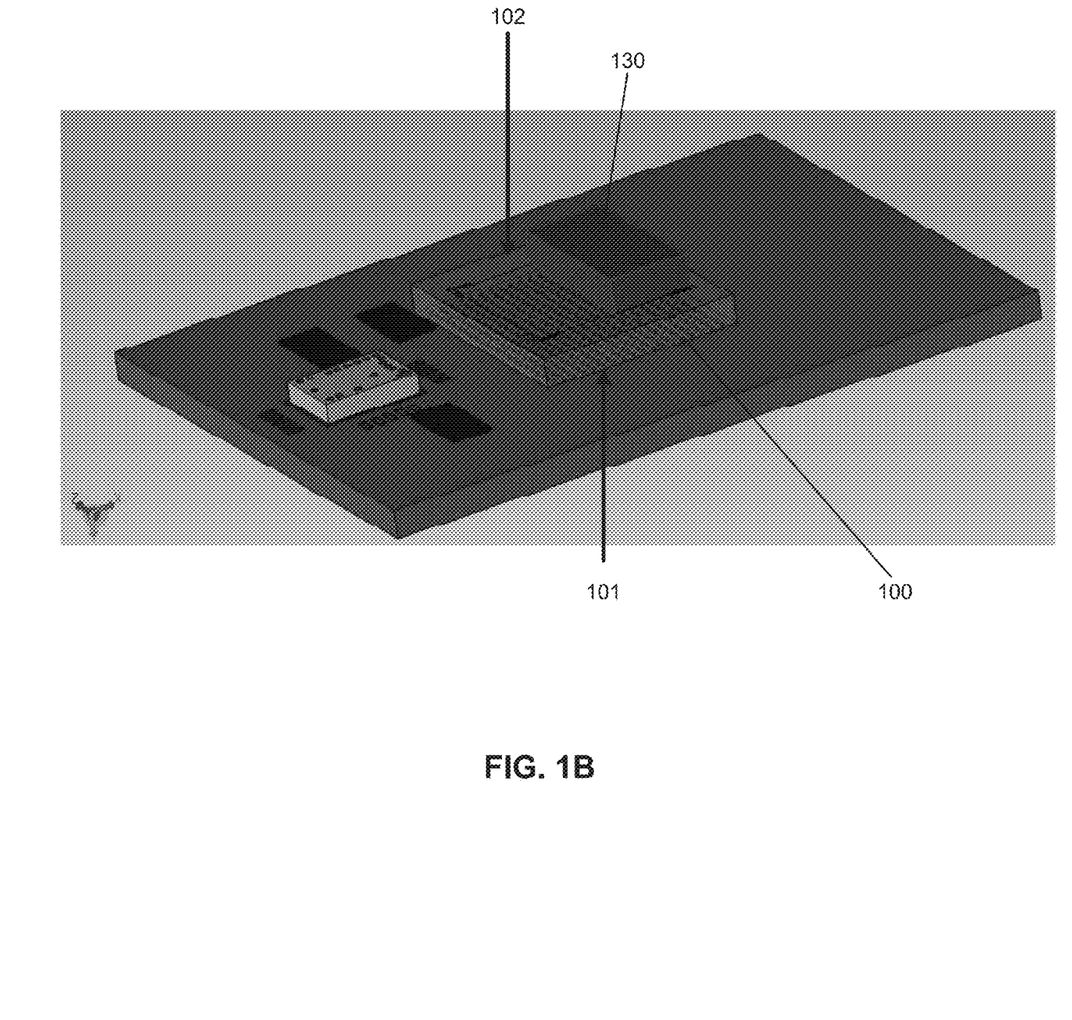

Prior art PIC optical input/output (I/O) interfaces at the top (e.g., the top side 101) or edge of a PIC are not compatible with flip-chip packaging; thus, optical I/O interfaces at the bottom (e.g., the bottom side 102 of the PIC 100) are to be utilized for PICs having a flip-chip design. The PIC 100 may include one or more light emitters to emit light out of the bottom side 102. FIG. 1B illustrates a lens array 130 disposed on the bottom side 102 of the PIC 100 to receive light emitted from these light emitters. These (one or more) light emitters may be fabricated on the top side 101 of the PIC 100, and thus light is emitted up through the PIC into the lens array 130. With this configuration, however, the optical and thermal interface of the PIC 100 now shares the same surface of the PIC die (i.e., the bottom side 102). Precise alignment of the lens array 130 to the light emitters of the PIC 100 may ensure that light is properly coupled to the lens array with minimal distortion or loss.

Some prior art solutions include an output lens patterned on to the back of the wafer; however, the thickness of the PIC die for these designs is constrained by the optical I/O interface (i.e., the formed output lens). Thus, this type of prior art optical I/O interface typically forces the PIC die to be thicker than a typical substrate to obtain output beam sizes for the optical I/O interface, due to the high index of refraction of semiconductor substrates. Prior art solutions that attempt to use low index substrate materials for a lens create another problem by preventing heat transport through these materials.

Figure 1C:
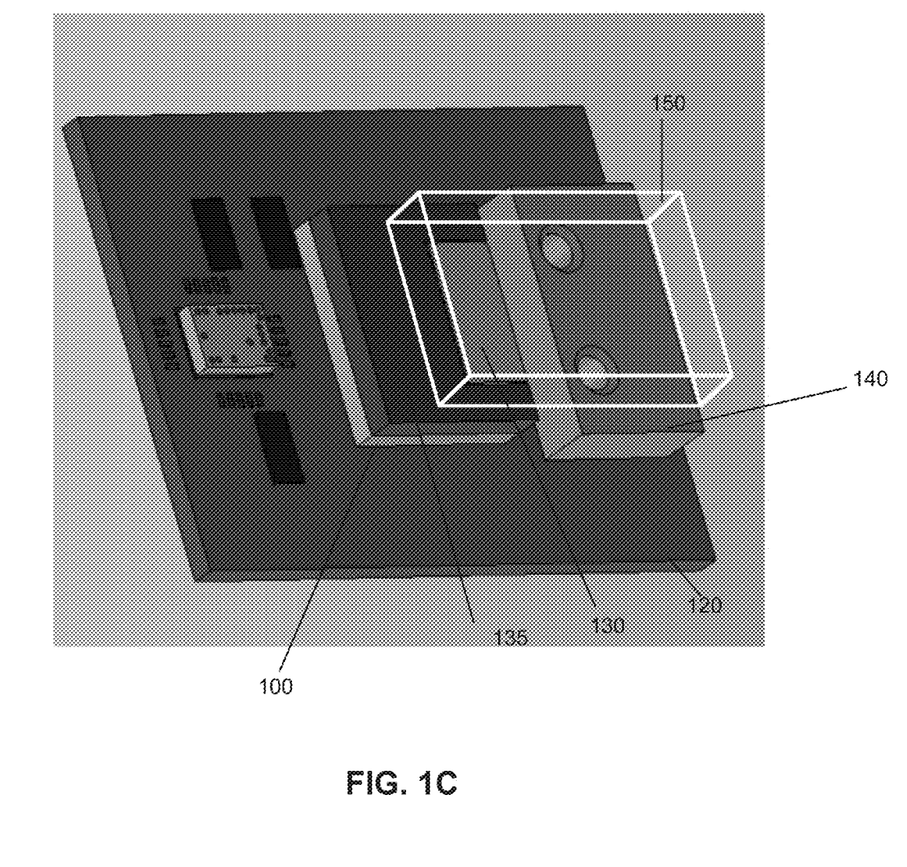

Embodiments of the disclosure utilize an optical I/O interface for the PIC 100 formed on the bottom side 102 (described in further detail below); this optical I/O interface does not substantially degrade the thermal path of the PIC 100 and allows for the thickness of the PIC die to be equal to or less than the expected wafer thickness of an electronic IC. FIG. 1C illustrates a heat spreading material 135 disposed on the PIC 100 to surround the lens array 130. In some embodiments, the heat spreading material 135 comprises a material with a similar coefficient of thermal expansion (CTE) to the material of the PIC 100, but with higher thermal conductivity. This allows the lens array 130 to comprise a material that can be shaped easily but has poor thermal conductivity, such as glass. Thus, embodiments can enable a higher performance optical I/O interface and thermal interface for PICs having a flip-chip design compared to a solution that uses the same material for each interface. (Materials that can provide optical performance and have high thermal conductivity, such as diamond, can be prohibitively expensive to use).

Embodiments may further provide features for aligning optical connectors with the optical I/O interface of the PIC 100 and/or the lens array 130. In the illustrated embodiment, a mechanical element 140 is also placed on the organic substrate 120 and next to the PIC 100 to help align an optical connector 150 to the lens array 130. In some embodiments, the PIC 100 may include features to help align external optical connectors (described in further detail below).

Figure 1D:
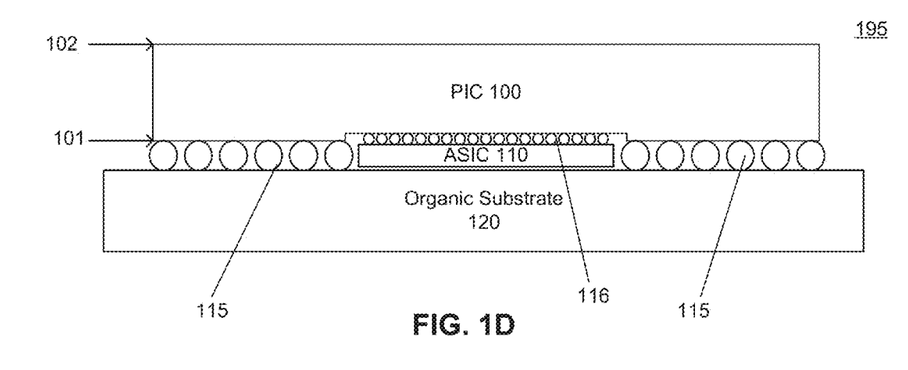

Furthermore, embodiments utilizing an optical I/O interface for the PIC 100 formed on the bottom side 102 allow for different configurations of the PIC 100 and the electronic components 110 on the organic substrate 120. FIG. 1D illustrates various configurations for the PIC 100 and at least one of the electronic components 100. A configuration 190 is illustrated as having the PIC 100 and the electronic components 110 (shown for exemplary purposes as a single ASIC) disposed on opposing sides of the substrate 120. In order to mount the PIC 100 to the organic substrate 120, it is "flipped" over so that the top side 101 faces down and the bottom side 102 faces up. As shown in this example, the BGA interconnects 115 of the PIC 100 and interconnects 116 for the ASIC 110 are both disposed onto opposing sides of the organic substrate 120 to communicatively couple the PIC and the ASIC.

FIG. 1D further illustrates a configuration 195 wherein the PIC 100 and the ASIC 110 (comprising control and/or driver circuitry for the PIC 100) are disposed on a same side of the organic substrate 120. As shown in this illustration, the ASIC 110 is disposed underneath the PIC 100 and communicatively coupled to the PIC 100 via the interconnects 116 of the ASIC 110; the BGA interconnects 115 of the PIC 100 are disposed on the organic substrate 120 to communicatively coupled the PIC 100 to other components of the device or system not illustrated (e.g., interconnection modules, power supplies, etc.).

Figure 2A:
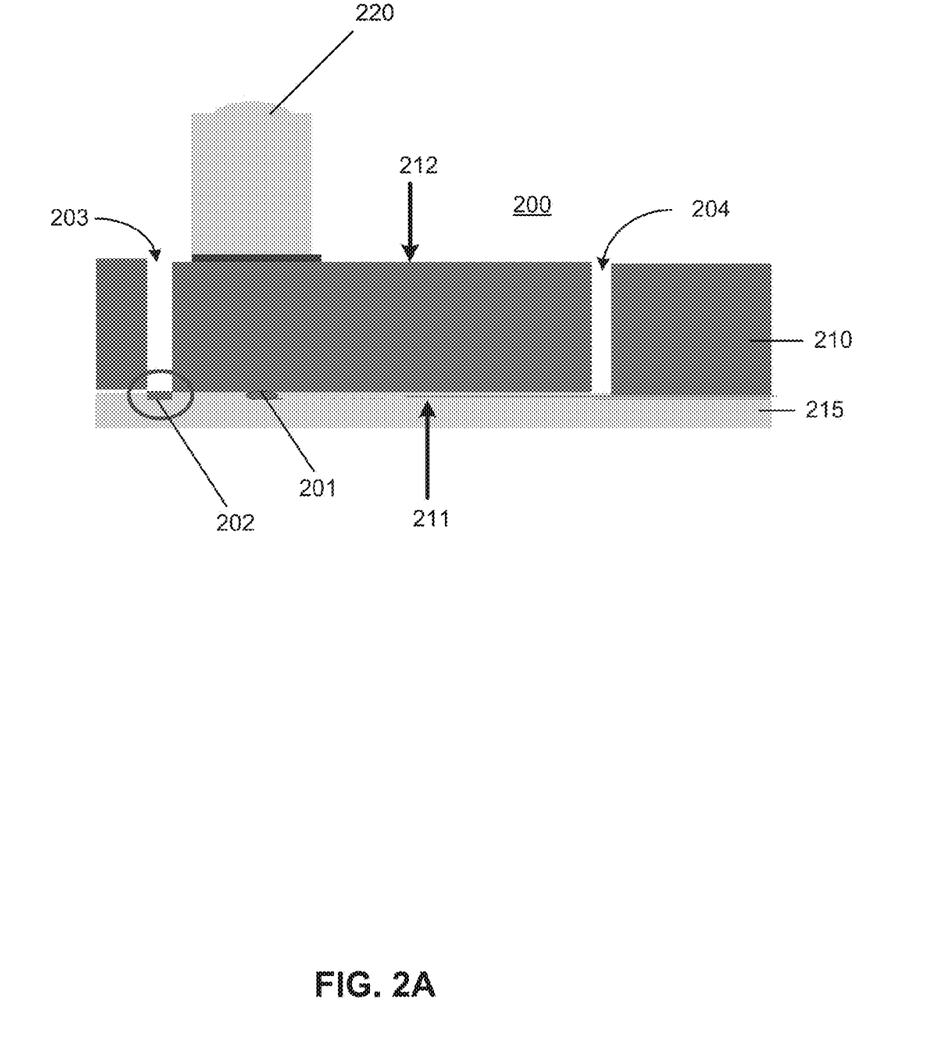
FIG. 2A and FIG. 2B illustrate PICs with alignment features for PIC light emitters according to embodiments of the disclosure.
Figure 2B:
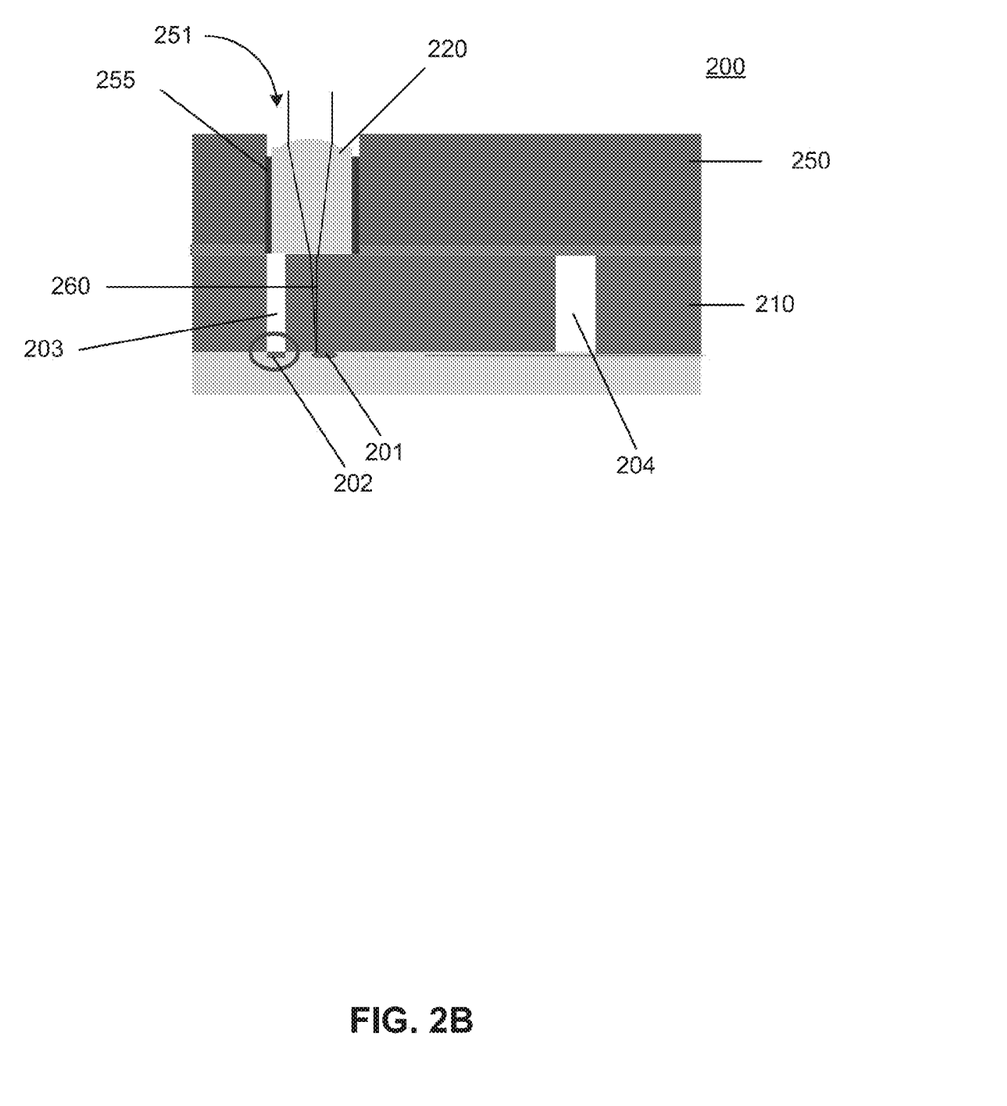

FIG. 2A and FIG. 2B illustrate PICs with alignment features for PIC light emitters according to embodiments of the disclosure. FIG. 2A illustrates a PIC 200 including a PIC layer 210 including a light emitter 201 and a corresponding alignment feature 202. The PIC 200 comprises the above described flip-chip design, wherein the light emitter 201 and the alignment feature 202 are disposed on a top side 211 of the PIC, and the top side 211 is flipped such that the PIC layer 210 is coupled to electrical contacts 215 (which are further coupled to interconnections of an organic substrate). Also shown are two holes 203 and 204 in the PIC layer 210.

A lens unit 220 is shown as an example of an optical interface unit to be disposed onto a bottom side 212 of the PIC layer 210 to function as an optical I/O interface for the PIC by emitting light received from the light emitter 201. The lens unit 220 is shown as a single lens (compared to the lens array 130 of FIGS. 1B-1C) for exemplary purposes only; the PIC 200 may utilize a plurality of lenses disposed in a similar manner. The lens unit 220 may comprise any material, such as glass, that has an index of refraction that is lower than that of the substrate of the PIC layer 210, thereby allowing the PIC emitter beam from the light emitter 201 to expand faster than it would in the material of the PIC layer 210 (in addition to most other efficient heat sinking materials). The expansion of the PIC emitter beam, in part, enables efficient I/O coupling.

The alignment feature 202 can comprise any formed or printed marker or fiducial (e.g., printed crosses or other distinct visual markers) for use as a point of reference or a measure in the field of view of an imaging system used to the place the lens unit 220 on the bottom side 212 of the PIC layer 210 with proper alignment to the light emitter 201. The alignment feature 202 may be formed during the same processing step as the light emitter 201, such that the offset between these elements is more precise and consistent compared to other features of the PIC layer 210 that may be used to determine the location of the light emitter (e.g., the distance of an edge of the PIC layer 210 to the light emitter 201, which can vary from chip to chip, etc.). Because the alignment feature 202 and the light emitter 201 can be formed during the same processing stage, they both appear on the top side 211 of the PIC layer 210.

Thus, the process of passively aligning the lens unit 220 to the light emitter 201 is based, at least in part, on registration to the emitter on the top side 211. In contrast to active alignment, in which a photonic component is electrically powered to either emit and/or detect light and the optical coupling components are aligned while the coupling efficiency of the light is monitored, passive alignment places optical components without using the coupling efficiency of light as a mechanism for optimization. Embodiments of the disclosure may conduct this passive alignment such that the alignment feature 202 can be imaged from the bottom side 212 of the PIC 200 by removing a portion of the PIC substrate to enable the alignment feature 202 to be seen (e.g., as shown with the hole 203), or by using light of a wavelength that is transparent to the substrate of the PIC; however, using light transparent to the substrate can affect the contrast of the alignment feature for the imaging system, and therefore compromise accuracy. In some embodiments, multiple alignment features may be used in multiple dimensions with respect to a light emitter —e.g., in the X, Y, or Z dimension, to further enable alignment of tip and tilt of the lens unit 220.

In this embodiment, the holes 203 and 204 may further provide thermal isolation for one or more components of the PIC layer 210. For example, for embodiments including a heat spreading material disposed above the PIC 200 (such as the heat spreading material 135 of FIG. 1C), the holes 203 and 204 may comprise air and therefore prevent heat from flowing to the heat spreading material. Thus, the hole 203 provides both an optical pathway to the alignment feature 202 and (in some embodiments) thermal isolation for one or more components of the PIC 200.

FIG. 2B illustrates an embodiment wherein the lens unit 220 is subsequently surrounded by a heat spreading material layer 250, which may comprise a material with a similar CTE to the material of the PIC layer 210 and a higher thermal conductivity than the material of the PIC layer 210. In this illustration, the heat spreading material layer 250 is shown to comprise a hole 251 to include the lens unit 220. In this embodiment, once the lens unit 220 is proper aligned to the light emitter 201 based, at least in part, on the alignment feature 202, a spacer material 255 is deposited to surround the lens to hold it in place in the heat spreading material layer 250. The spacer material 255 can comprise metal, silicon, UV-cured epoxy, or other material to enable heat sinking of the PIC out through the "top" of the heat spreading material layer 250. As shown in this illustration, the lens unit 220 when properly aligned allows the PIC emitter beam 260 from the light emitter 201 to expand faster than it would in the material of the PIC layer 210 (in addition to most other efficient heat sinking materials); this expansion of the PIC emitter beam 260, in part, enables efficient I/O coupling to external optical connectors coupled to the PIC 200.

As discussed above, alignment features may be visible via the holes 203 and 204 comprising air. In some embodiments, these holes can provide thermal isolation to components of the PIC 200 by preventing heat from being transferred out of the PIC 200 to the heat spreading material layer 250. In other embodiments, these holes can be filled once they have been used to align a lens unit to a light emitter of a PIC.

Figure 3:
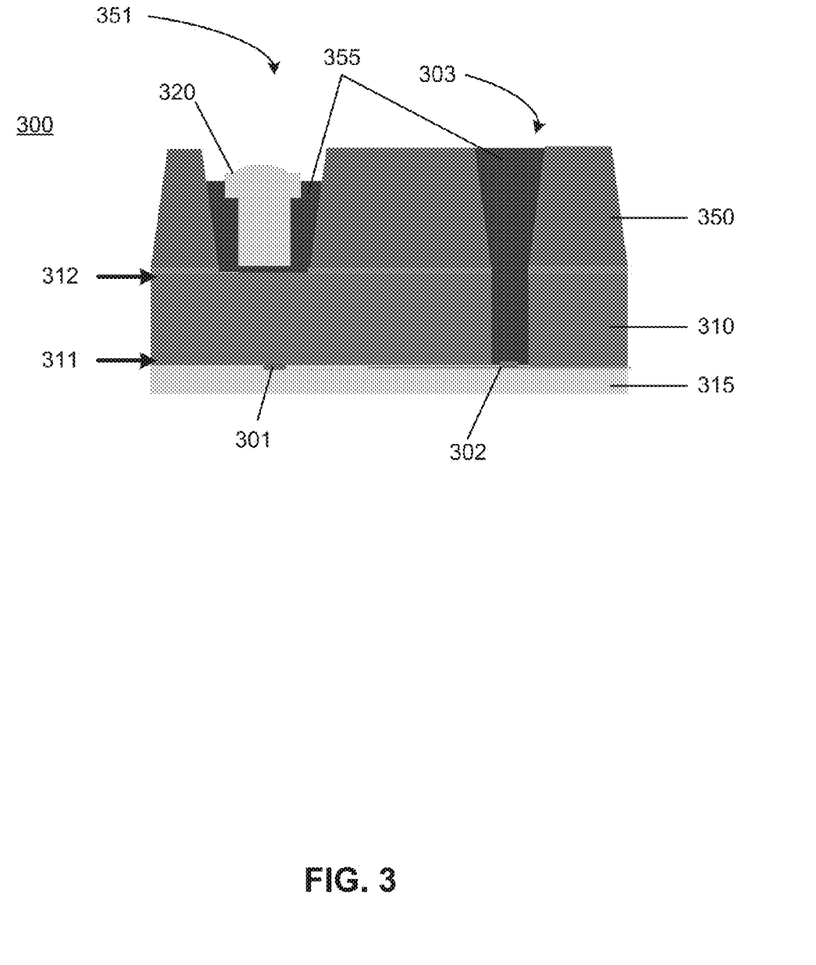
FIG. 3 illustrates a PIC with alignment features for a PIC light emitter according to an embodiment of the disclosure.

FIG. 3 illustrates a PIC with alignment features for a PIC light emitter according to an embodiment of the disclosure. In this embodiment, a PIC 300 includes a light emitter 301 and an alignment feature 302 included in a PIC layer 310; the PIC 300 comprises the above described flip-chip design, wherein the light emitter 301 and the alignment feature 302 are disposed on a top side 311 of the PIC layer 310, and the top side 311 is flipped such that the PIC layer 310 is coupled to electrical contacts 315 (which are further coupled to interconnections of an organic substrate).

In this embodiment, a heat spreading material layer 350 is disposed on a bottom side 312 of the PIC 300 prior to placement of a lens unit 320. The heat spreading material layer 350 is shown to include a hole 351 having dimensions larger than the lens unit 320, so that the placement of the lens unit 320 within the heat spreading material layer 350 can be adjusted based on the alignment feature 302.

Similarly to the embodiments described above, the alignment feature 302 is used during passive alignment of the lens unit 320 to the light emitter 301 so that light is emitted from the bottom side 312. The alignment feature 302 is visible from the bottom side 312 via a hole 303 (which is shown to extend through the PIC layer 310 and the heat spreading material layer 350). In this embodiment, once the lens unit 320 has been placed within the heat spreading material layer 350, a spacer material 355 can be deposited to surround the lens unit 320 to hold it in place and can be deposited in the hole 303 to allow for heat to transfer from the PIC layer 310 to the heat spreading material layer 350. Thus, the spacer material 355, when used to fill the hole 303, ensures that no components on the PIC within proximity of the hole 303 are thermally isolated (in contrast to an unfilled hole comprising air).

Figure 4A:
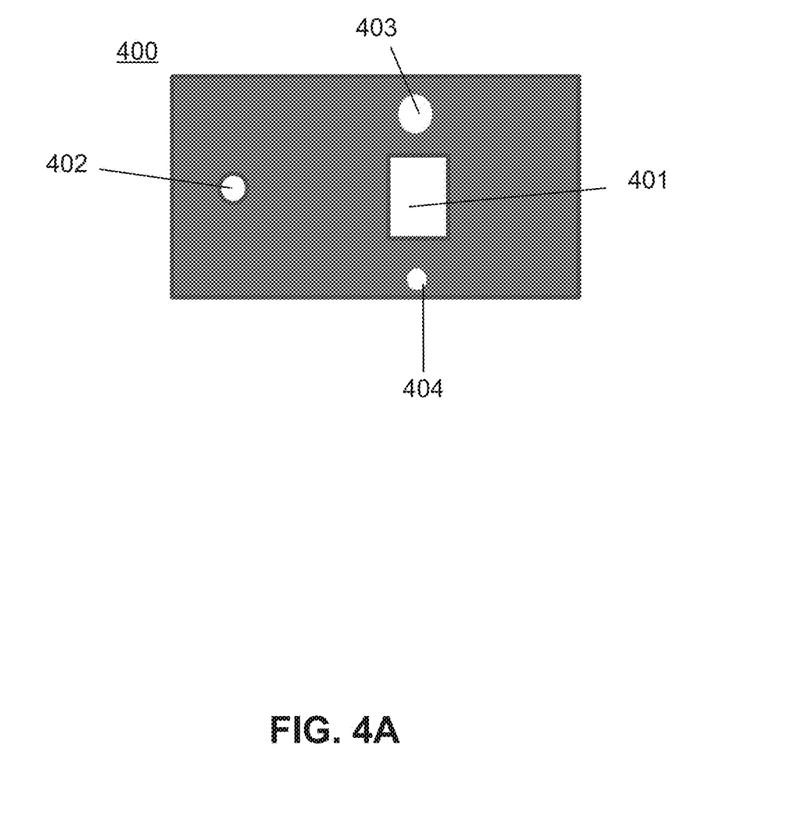
FIG. 4A is an illustration of a device layer according to an embodiment of the disclosure.

FIG. 4A is an illustration of a device layer 400 according to an embodiment of the disclosure. Holes 401-404 may be formed in at least one of a photonic semiconductor substrate layer, a heat spreading material layer, etc., using any known substrate processing removal technique (e.g., etching process, etc.).

In this embodiment, the hole 401 comprises a hole for placing a lens assembly to receive and/or emit light from a light emitter of a PIC, while the hole 402 may comprise a hole for viewing an alignment feature used to passively align said lens assembly to the light emitter, as described above. In this embodiment, the holes 403 and 404 can be formed to further align an optical connector (external to the PIC) to the lens and light emitter. The external optical connector is to comprise one or more features to "fit" into the holes 403 and 404 with some tolerance for physical variation of the connector; in some embodiments, beam expansion from the lens placed within the PIC may further provide additional tolerance to potential variations of the connector. The hole 403 is shown to be of a larger size than the hole 404; the hole 403 can be used for coarser alignment for an optical connector, while the hole 404 can be used for finer alignment for an optical connector. In other embodiments, any number and any type of semiconductor processing features can be formed in a PIC substrate to aid in the passive alignment of external optical connectors to the PIC.

Figure 4B:
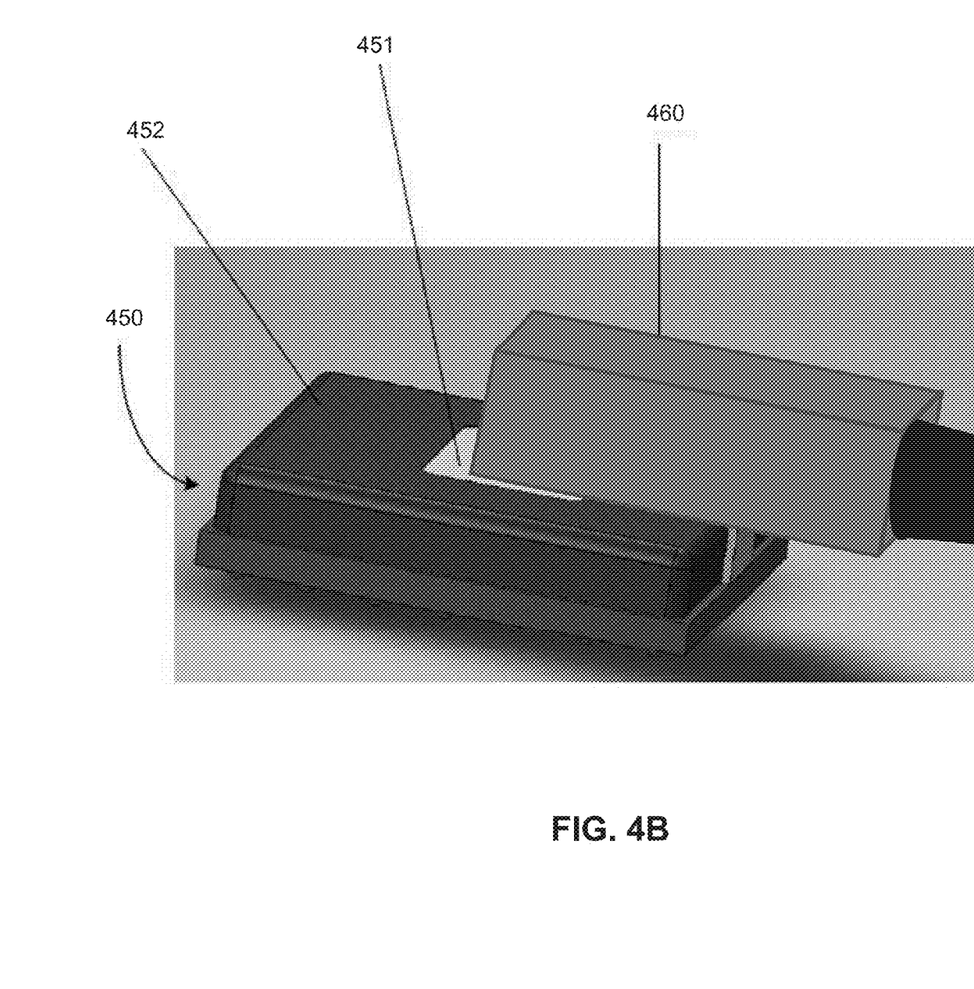
FIG. 4B is an illustration of a PIC package including alignment features for an external connector according to an embodiment of the disclosure.

FIG. 4B is an illustration of PIC package including alignment features for an external connector according to an embodiment of the disclosure. In this embodiment, a PIC 450 having a flip-chip design (and shown to include an exposed die bottom side 451) is shown to have a flip-chip chip scale package (fcCSP) with an overmold cap 452 used to protect the PIC from structural and environmental damage. In this embodiment, the exposed die bottom side 451 of the PIC 450 can include one or more features for aligning an optical connector 460 to the light emitters of the PIC (or PIC optical interfaces, such as lens units).

Figure 5:
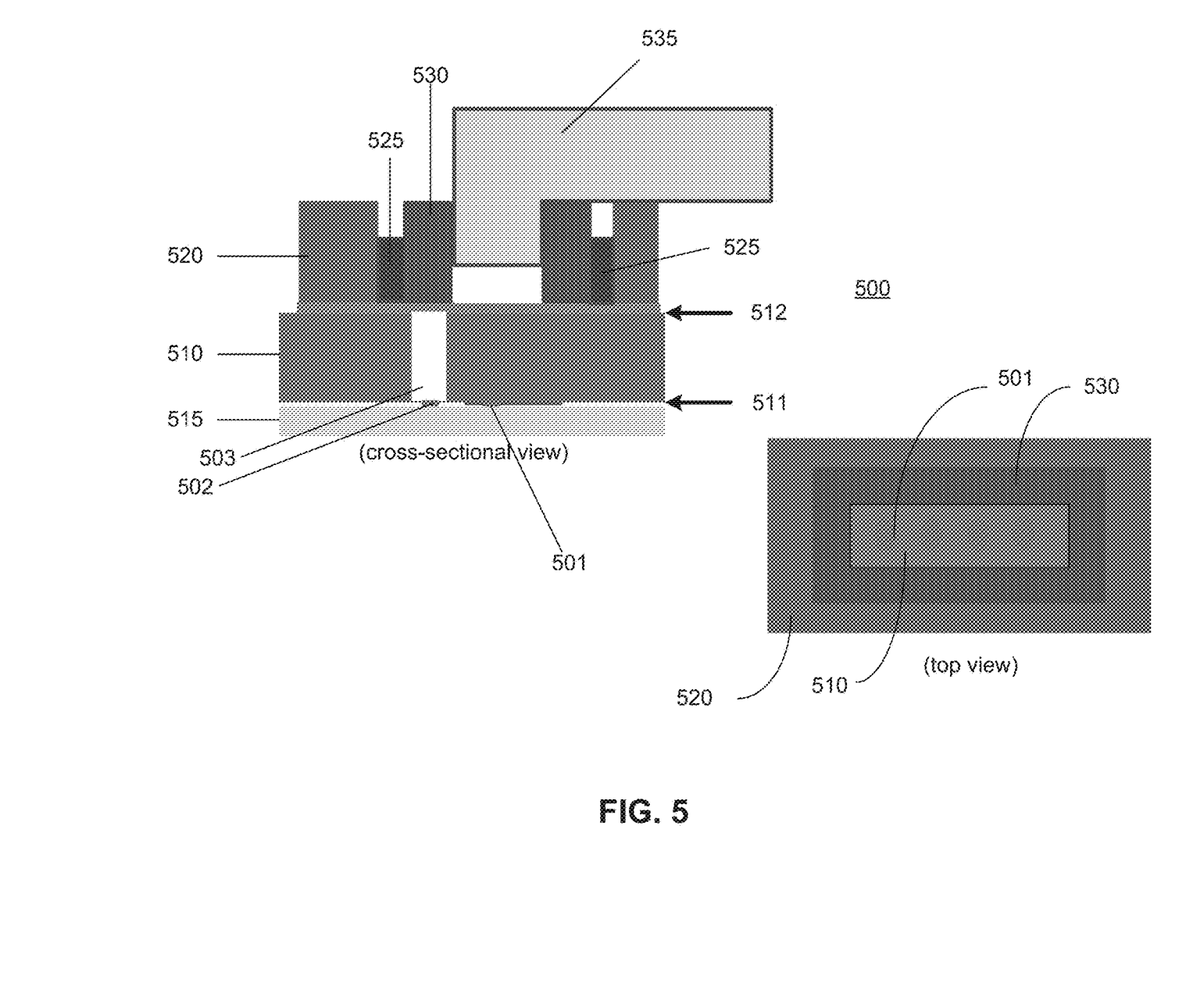
FIG. 5 is an illustration of a PIC with alignment features for an optical coupler structure according to an embodiment of the disclosure.

FIG. 5 is an illustration of a PIC with alignment features for an optical coupler structure according to an embodiment of the disclosure. In this embodiment, a PIC 500 is illustrated as including a light emitter 501 and a corresponding alignment feature 502 formed on a top side 511 of a PIC layer 510; the PIC 500 comprises the above described flip-chip design, wherein the light emitter 501 and the alignment feature 502 are disposed on the top side 511 of the PIC, and the top side 511 is flipped such that the PIC layer 510 is coupled to electrical contacts 515 (which are further coupled to interconnections of an organic substrate). A heat spreading material layer 520 is also shown to be disposed on the bottom side 512 of the PIC layer 510.

In contrast to the embodiments described above, the alignment feature 502 is used to align a mechanical structure 530 to the light emitter 501. The mechanical structure 530 is as an example of an optical interface unit used to passively align a connector 535 including optical I/O elements to the light emitter 501 (shown to be one of several light emitters of the PIC 500 in the top view illustration of the PIC 500). The alignment feature 502 can be one of a plurality of alignment features used to align the mechanical structure 530 in any dimension (e.g., any combination of the X, Y, and Z dimensions), for use as a point of reference or a measure in the field of view of an imaging system used to place the mechanical structure 530 on the bottom side 512 of the PIC layer 510 with proper alignment to the light emitter 501 (and the other light emitters of the PIC layer 510). Spacer material 525 is used to secure the mechanical structure 530 in place.

Figure 6:
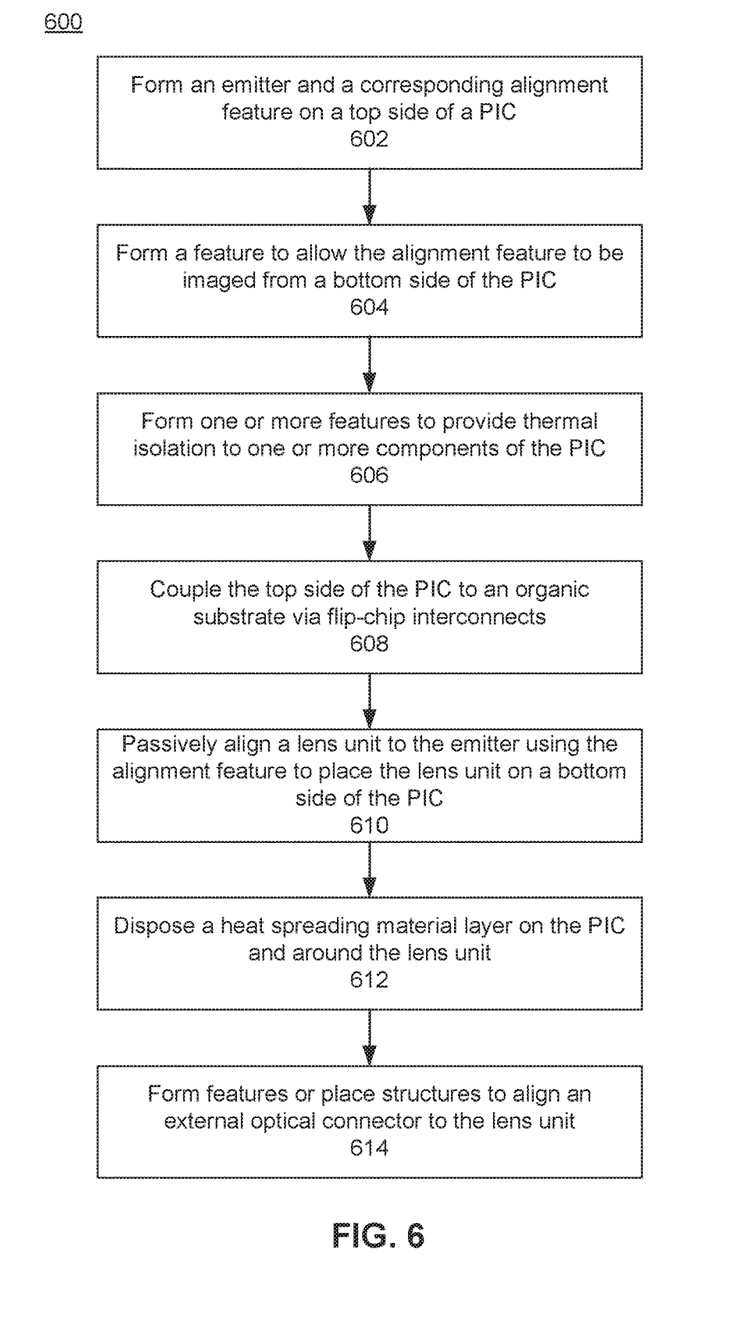
FIG. 6 is a flow chart for creating and utilizing alignment features to align a lens unit to an optical input/output (I/O) interface of a PIC according to an embodiment of the disclosure.

FIG. 6 is a flow chart for a process 600 for creating and utilizing alignment features to align a lens unit to an optical I/O interface of a PIC according to an embodiment of the disclosure. Flow diagrams as illustrated herein provide examples of sequences of various process actions. Although the actions are shown in a particular sequence or order, unless otherwise specified, the order of the actions can be modified. Thus, the described and illustrated implementations should be understood only as examples. The illustrated actions can be performed in a different order, and some actions can be performed in parallel. Additionally, one or more actions can be omitted in various embodiments; thus, not all actions are required in every implementation. Other process flows are possible.

In this embodiment, the process 600 includes executing an operation to form an emitter and a corresponding alignment feature (or a plurality of alignment features) on a top side of a PIC (block 602). As discussed above, an emitter and its corresponding alignment feature can be formed in a same processing step, thereby creating a consistent, knowable distance offset. The alignment feature can be anything visible by an imaging system (e.g., a printed fiducial).

An operation is executed to form a feature to allow the alignment feature to be imaged from a bottom side of the PIC (block 604). This feature may comprise a hole etched to (or within sufficient proximity to) the alignment feature. Light transparent to the substrate can be utilized in embodiments where holes are not etched (or not etched completely) to the alignment feature.

As discussed above, a hole in the PIC comprising an air cap can thermally isolate optical components of the PIC. In this embodiment, an operation is executed to form additional features (e.g., holes) to provide thermal isolation to one or more components of the PIC (block 606). In other embodiments, any etched holes may be filled with a spacer material to allow heat to leave the PIC through the (filled) etched holes.

An operation is executed to flip the PIC such that the top side is coupled to an organic substrate via flip-chip electrical interconnects (block 608). Thus, the bottom side of the PIC is the top-facing side of the PIC subsequent to this operation. An operation to place a lens unit onto the PIC to receive light from the emitter includes passively aligning the lens unit to the emitter using the alignment feature (block 610). The alignment feature is used as a point of reference or a measure in the field of view of an imaging system, which then places the lens unit on the PIC with proper alignment to the light emitter using the knowable distance offset between the emitter and the alignment feature. The alignment feature can thus be horizontally offset, vertically offset, or offset depthwise with respect to the light emitter. Furthermore, alignment features may be used to ensure proper tilt of the lens unit to the emitter, or for any other positioning of the lens unit.

In this embodiment, an operation is executed to dispose a heat spreading material layer on the PIC and around the lens unit (block 612). In other embodiments, a heat spreading material layer may be disposed on the PIC prior to placement of the lens unit (i.e. the heat spreading material layer is to comprise a hole for the lens unit to be placed within). An operation is executed for form features and/or structures (or place previously formed structures) to align an external optical connector to the lens unit (block 614). Features (e.g., holes corresponding to physical elements of the optical connector) can be included in the PIC and/or the heat spreading material layer disposed on the bottom side of the PIC to passively align the external optical connector. Structures can also be placed adjacent to the PIC to passively align the external optical connector.

Reference throughout the foregoing specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout the specification are not necessarily all referring to the same embodiment. Furthermore, the particular features, structures, or characteristics can be combined in any suitable manner in one or more embodiments. In addition, it is to be appreciated that the figures provided are for explanation purposes to persons ordinarily skilled in the art and that the drawings are not necessarily drawn to scale. It is to be understood that the various regions, layers, and structures represented in the figures can vary in size and dimensions.

The above described embodiments can comprise silicon on insulator (SOI) or silicon-based (e.g., silicon nitride (SiN)) devices, or can comprise devices formed from both silicon and a non-silicon material. Said non-silicon material (alternatively referred to as "heterogeneous material") can comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V-based materials can be significantly higher than in silicon-based materials, as electron speed in III-V semiconductors is much faster than that in silicon semiconductors. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in heterogeneous optical devices; in some embodiments, said heterogeneous devices utilize low-loss heterogeneous optical waveguide transitions between the devices' heterogeneous and silicon-only waveguides.

Magneto-optic materials allow heterogeneous PICs to operate based on the magneto-optic (MO) effect. Such devices can utilize the Faraday effect, in which the magnetic field associated with an electrical signal modulates an optical beam, offering high bandwidth modulation, and rotates the electric field of the optical mode, enabling optical isolators. Said magneto-optic materials can comprise, for example, materials such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials can comprise, for example, lithium niobate ($LiNbO_3$) or lithium tantalate ($LiTaO_3$).

In the foregoing detailed description, the method and apparatus of the present subject matter have been described with reference to specific exemplary embodiments thereof It will, however, be evident that various modifications and changes can be made thereto without departing from the broader spirit and scope of the present inventive subject matter. The present specification and figures are accordingly to be regarded as illustrative rather than restrictive.

Some embodiments describe an apparatus comprising an optical interface unit, a photonic integrated circuit (PIC), including a bottom side, wherein the optical interface unit is disposed on the bottom side, a top side including a flip-chip interface for electrically coupling the PIC to an organic substrate via the top side, an emitter to emit light through the PIC out of the bottom side to the optical interface unit, and an alignment feature corresponding to the emitter and formed with the emitter to be offset by a predetermined distance value, wherein the PIC comprises a processing feature to image the alignment feature from the bottom side, and a heat spreader layer surrounding the optical interface unit and disposed on the bottom side of the PIC to spread heat from the PIC.

In some embodiments, the processing feature of the PIC comprises a hole etched to provide a line of sight to the alignment feature via the bottom side of the PIC. In some embodiments, the hole comprises an air gap and is further aligned with one or more components of the PIC to provide thermal isolation to the one or more components. In some embodiments, the apparatus further comprises a spacer material to fill the hole of the PIC. In some embodiments, the spacer material is further disposed in a hole of the heat spreader layer including the optical interface unit to secure the optical interface unit within the heat spreader layer.

In some embodiments, the apparatus further comprises a structure for aligning an optical connector to the optical interface unit. In some embodiments, the structure for aligning the optical connector to the optical interface unit is separate from the heat spreader layer, the PIC, and the optical interface unit. In some embodiments, the structure comprises recessed processing features included in the heat spreader layer corresponding to one or more features of the optical connector. In some embodiments, the structure comprises recessed processing features included in the optical interface unit corresponding to one or more features of the optical connector.

In some embodiments, the offset between the emitter and the corresponding alignment feature comprises at least one of a horizontal offset, a vertical offset, or a depth offset. In some embodiments, the optical interface unit comprises a structure for passively aligning an optical input/output (I/O) interface of an external connector to the emitter of the PIC. In some embodiments, the optical interface unit comprises a lens unit, such as a single lens or a lens array.

In some embodiments, the apparatus further comprises an electrical integrated circuit (IC) including control or driver circuitry for one or more devices of the PIC and an electrical input/output (I/O) interface, and an organic substrate. In some embodiments, the organic substrate is to communicatively couple the PIC and the electrical IC, wherein the electrical I/O interface of the electrical IC and the flip-chip interface of the PIC are disposed on opposing sides of the organic substrate. In some embodiments, the electrical IC is disposed underneath the PIC, and the electrical I/O interface is disposed onto the PIC to communicatively coupled the electrical TIC to the PIC.

Some embodiments describe a method comprising forming an emitter and a corresponding alignment feature on a top side of a photonic integrated circuit (PIC) to be offset by a predetermined distance value, wherein the alignment feature can be imaged from a bottom side of the PIC, coupling the top side of the PIC to an organic substrate via flip-chip interconnects, passively aligning an optical interface unit to the emitter using the alignment feature to place the optical interface unit on the bottom side of the PIC, and disposing a heat spreading material layer on the PIC, the optical interface unit included in the heat spreading material layer.

In some embodiments, the method further comprises etching a hole on the bottom side of the PIC such that the alignment feature is viewable via the hole. In some embodiments, the method further comprises etching an additional one or more holes on the bottom side of the PIC to thermally isolate one or more optical components of the PIC. In some embodiments, the method further comprises depositing a spacer material in the etched hole to surround the optical interface unit within the hole.

In some embodiments, the method further comprises forming one or more features in the heat spreading material layer to correspond to an external optical connector. In some embodiments, the method further comprises forming one or more features in the optical interface to correspond to an external optical connector. In some embodiments, passively aligning the optical interface unit to the emitter using the alignment feature includes at least one of a horizontal adjustment to a placement of the optical interface unit, a vertical adjustment to the placement of the optical interface unit, a depth adjustment to the placement of the optical interface unit, or a tilt adjustment to the optical interface unit.

The invention claimed is:

1. A layered photonic integrated circuit, comprising:
a photonic integrated circuit layer including a first material having a first thermal conductivity and a first refractive index;
a thermally conductive layer positioned adjacent a first side of the photonic integrated circuit layer and formed from a second material having a second thermal conductivity greater than the first thermal conductivity, the thermally conductive layer defining a hole extending to the first side of the photonic integrated circuit layer;
a light emitter positioned proximate an opposed second side of the photonic integrated circuit layer to emit light through the photonic integrated circuit layer; and
a lens positioned proximate the hole in the thermally conductive layer and positioned to receive light emitted from the light emitter, the lens having a second refractive index less than the first refractive index.

2. The photonic integrated circuit of claim 1, wherein the lens is shaped to collimate the light emitted from the light emitter.

3. The photonic integrated circuit of claim 1, further comprising a third material positioned between the lens and the thermally conductive layer and configured to secure the lens in the hole.

4. The photonic integrated circuit of claim 3, wherein the third material includes at least one of a metal, silicon, or UV-cured epoxy.

5. The photonic integrated circuit of claim 1, wherein the thermally conductive layer has a coefficient of thermal expansion matched to a coefficient of thermal expansion of the photonic integrated circuit layer.

6. The photonic integrated circuit of claim 1, wherein the photonic integrated circuit layer defines a second hole extending from the hole in the thermally conductive layer and extending through the photonic integrated circuit layer.

7. The photonic integrated circuit of claim 6, further comprising a fourth material positioned in the second hole.

8. The photonic integrated circuit of claim 7, wherein the fourth material includes at least one of a metal, silicon, or UV-cured epoxy.

9. The photonic integrated circuit of claim 6, further comprising an alignment feature positioned on the second side of the photonic integrated circuit layer and positioned to be visible through the second hole.

10. The photonic integrated circuit of claim 9, wherein the alignment feature is a fiducial that includes a printed cross.

11. The photonic integrated circuit of claim 9, wherein the alignment feature is formed with the light emitter so that the alignment feature and the light emitter are offset by a predetermined value.

12. A method, comprising:
producing light with a light emitter;
directing the light through a photonic integrated circuit layer having a second side positioned proximate the light emitter, the photonic integrated circuit layer including a first material having a first thermal conductivity and a first refractive index; and
collimating the light with a lens, the lens having a second refractive index less than the first refractive index, the lens being positioned within a hole in a thermally conductive layer, the thermally conductive layer being positioned adjacent a first side of the photonic integrated circuit layer opposite the second side of the photonic integrated circuit layer, the thermally conductive layer being formed from a second material having a second thermal conductivity greater than the first thermal conductivity.

13. The method of claim 12, further comprising:
securing the lens in the hole with a third material positioned between the lens and the thermally conductive layer;
wherein the third material includes at least one of a metal, silicon, or UV-cured epoxy.

14. The method of claim 12, wherein the thermally conductive layer has a coefficient of thermal expansion matched to a coefficient of thermal expansion of the photonic integrated circuit layer.

* * * * *